(12) United States Patent  (10) Patent No.: US 6,558,291 B1
Salecker  (45) Date of Patent: May 6, 2003

(54) MOTOR VEHICLE

(75) Inventor: Michael Salecker, Stuttgart/Sonnenberg (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/549,313

(22) Filed: Apr. 13, 2000

(30) Foreign Application Priority Data

Apr. 16, 1999 (DE) .......................................... 199 17 280
Apr. 28, 1999 (DE) .......................................... 199 19 342

(51) Int. Cl.⁷ .............................................. B60K 41/12
(52) U.S. Cl. ........................................................ 477/47
(58) Field of Search ............................. 477/42, 47, 108

(56) References Cited

U.S. PATENT DOCUMENTS

| 4,561,327 | A | * | 12/1985 | Niwa et al. ................. | 477/47 X |
| 4,680,990 | A | * | 7/1987 | Ohgami ..................... | 477/49 X |
| 4,760,760 | A | * | 8/1988 | Miyawaki .................. | 477/47 X |
| 4,784,021 | A | * | 11/1988 | Morimoto .................. | 477/47 X |
| 4,872,115 | A | * | 10/1989 | Itoh et al. .................. | 477/43 X |
| 4,947,953 | A | * | 8/1990 | Morimoto .................. | 477/42 X |
| 4,976,170 | A | * | 12/1990 | Hayashi et al. ............ | 477/47 X |
| 5,050,455 | A | * | 9/1991 | Yamashita et al. ........ | 477/43 X |
| 5,217,412 | A | | 6/1993 | Indlekofer et al. ............ | 474/69 |
| 5,474,505 | A | * | 12/1995 | Seidel et al. .............. | 477/43 X |
| 5,501,309 | A | | 3/1996 | Walth et al. ............... | 192/3.29 |
| 5,514,050 | A | * | 5/1996 | Bauerle et al. ........... | 477/47 X |
| 5,667,448 | A | | 9/1997 | Friedmann ................. | 474/18 |
| 5,711,730 | A | | 1/1998 | Friedman et al. ............. | 474/18 |
| 5,725,456 | A | | 3/1998 | Fischer et al. ............... | 477/174 |
| 5,749,804 | A | * | 5/1998 | Toukura ........................ | 477/47 |
| 5,759,106 | A | | 6/1998 | Reik et al. ..................... | 464/68 |
| 5,782,327 | A | | 7/1998 | Otto et al. ................. | 192/3.29 |
| 5,913,746 | A | * | 6/1999 | Bauerle ........................ | 477/47 |
| 6,181,020 | B1 | * | 1/2001 | Uchida et al. ............ | 477/47 X |
| 6,205,687 | B1 | * | 3/2001 | Ochiai ....................... | 477/47 X |
| RE37,469 | E | * | 12/2001 | Toukura ........................ | 477/47 |

FOREIGN PATENT DOCUMENTS

| DE | 195 46 294 A 1 | | 6/1996 | |
| JP | 360098255 | * | 6/1985 | .................. 477/42 |
| JP | 362122834 | * | 6/1987 | .................. 477/47 |
| JP | 402021057 | * | 1/1990 | .................. 477/42 |

* cited by examiner

Primary Examiner—Richard M. Lorence
Assistant Examiner—Roger Pang
(74) Attorney, Agent, or Firm—Darby & Darby

(57) ABSTRACT

A motor vehicle wherein the combustion engine normally transmits torque to the wheels by way of an infinitely variable ratio transmission but receives torque from the wheels when the vehicle is coasting. The operator of the vehicle can manipulate one or more components (e.g., the gas pedal) of an actuating unit which includes one or more sensors arranged to monitor one or more parameters of the vehicle, and the ratio of the transmission is automatically regulated—at least temporarily—when the vehicle is coasting so that the speed of the coasting vehicle does not increase but decreases or remains unchanged. For example, one sensor can monitor the speed of the motor vehicle and another sensor can ascertain whether or not the gas pedal is depressed.

2 Claims, 2 Drawing Sheets

MOTOR VEHICLE

BACKGROUND OF THE INVENTION

The invention relates to motor vehicles in general, and more particularly to improvements in methods of and in means for controlling the speed of a motor vehicle during coasting. Still more particularly, the invention relates to improvements in methods of and in means for controlling the coasting speed of a motor vehicle wherein the power train employs a prime mover (such as an internal combustion engine) and an infinitely variable ratio transmission which serves to transmit torque (a) from the prime mover to the wheels when the vehicle is driven by the prime mover and (b) from the wheels to the prime mover while the vehicle is coasting.

Motor vehicles employing power trains of the above outlined character are disclosed, for example, in German patent No. 195 46 294. The automatic infinitely variable ratio transmission in the power train of the patented motor vehicle is a so-called CVT employing two adjustable pulleys or sheaves and an endless flexible torque transmitting element which is trained over the pulleys. An advantage of such transmissions (in comparison with transmissions having limited numbers of gear ratios) is that automatic adjustments of the transmission ratio render it possible to achieve substantial savings in fuel.

A drawback of numerous power trains in presently known motor vehicles is that, during coasting (i.e., when the vehicle is in motion while the wheels roll along a downwardly sloping surface and while the operator keeps her or his foot off the gas pedal), the vehicle is or is likely to be accelerated to a speed which often exceeds a maximum permissible value.

OBJECTS OF THE INVENTION

An object of the present invention is to provide a motor vehicle with a power train which employs an infinitely variable ratio transmission and the speed of which during coasting is regulated in a novel and improved way.

Another object of the invention is to provide novel and improved controls which automatically influence the operation of the power train when the motor vehicle is coasting.

A further object of the invention is to provide the power train of a motor vehicle with automatic controls for the speed of the motor vehicle during coasting.

An additional object of the invention is to reduce the likelihood of accidents and/or damage to motor vehicles during coasting.

Still another object of the invention is to provide a power train which renders it possible to regulate the vehicle speed during coasting and which can be installed in existing motor vehicles.

A further object of the instant invention is to provide a novel and improved method of automating the operation of the power train in a motor vehicle while the vehicle is coasting.

Another object of the invention is to provide a novel and improved method of preventing excessive acceleration of a motor vehicle during travel along a downwardly sloping road surface and while the operator of the motor vehicle abstains from influencing the speed of the vehicle such as by permitting operation of the prime mover at idling speed.

SUMMARY OF THE INVENTION

One feature of the present invention resides in the provision of a motor vehicle which comprises an infinitely variable ratio transmission including a rotary input member and a rotary output member (at least one of these members can constitute a shaft), at least one wheel arranged to receive torque from the output member when the prime mover drives the input member of the transmission and to transmit torque to the prime mover by way of the input and output members when the motor vehicle is coasting, and operator-manipulatable actuating means for influencing the prime mover. Such actuating means includes monitoring means arranged to ascertain at least one variable parameter of the motor vehicle, and the vehicle further comprises means is for infinitely varying the ratio of the transmission; such infinitely varying means includes means for at least temporarily regulating the transmission ratio to prevent an increase (or an excessive increase) of vehicle speed when the motor vehicle is coasting.

The monitoring means can include a sensor (e.g., a suitable tachometer generator) which is arranged to ascertain the speed of the motor vehicle and to influence the aforementioned means for infinitely varying the ratio of the transmission so as to change the transmission ratio in a sense (i.e., in a direction) to reduce the speed of the motor vehicle while the vehicle is coasting and its speed tends to increase so that, as a result of the change of transmission ratio, the speed of the motor vehicle remains at least substantially constant. The monitoring means of such power train can further include means for detecting absence of manipulation of the actuating means by the operator of the motor vehicle; such absence of manipulation detecting means can include a switch or another suitable sensor which monitors the position of the gas pedal and transmits a signal at least when the gas pedal is not depressed.

In accordance with a modification, the monitoring means can include a sensor which is arranged to ascertain the speed of the motor vehicle and to influence the means for infinitely varying the ratio of the transmission in order to change the ratio of the transmission while the motor vehicle is coasting so that the speed of the motor vehicle is reduced at least until the transmission ratio reaches a preselected value. Such monitoring means can further include the aforementioned means for detecting absence of manipulation of the actuating means by the operator of the motor vehicle.

In accordance with another modification which can be put to use when the prime mover is a variable-RPM prime mover (such as a combustion engine), the monitoring means includes a sensor which is arranged to ascertain the speed of the motor vehicle and to influence the means for infinitely varying the ratio of the transmission in order to change the transmission ratio when the motor vehicle is coasting in such a way that the speed of the motor vehicle remains at least substantially constant until the RPM of the prime mover reaches a predetermined threshold value. The monitoring means can further include means for detecting absence of manipulation of the actuating means by the operator of the motor vehicle.

Another feature of the instant invention resides in the provision of a method of operating a variable-speed motor vehicle wherein a prime mover (such as an internal combustion engine) drives an infinitely variable ratio transmission when the motor vehicle is not coasting, wherein the infinitely variable ratio transmission drives the prime mover when the vehicle is coasting, and wherein an operator-manipulated actuating means is arranged to influence the prime mover and embodies means for monitoring at least one variable parameter of the motor vehicle. The method comprises at least one step, namely the step of infinitely varying the ratio of the transmission to at least temporarily regulate the transmission ratio in a sense to prevent an increase of the speed of the motor vehicle when the vehicle is coasting.

The method can further comprise the steps of monitoring the speed of the motor vehicle and altering the ratio of the transmission in a sense to reduce the speed of the motor vehicle when the motor vehicle is coasting and its speed tends to increase so that the speed of the motor vehicle during coasting remains at least substantially constant.

Alternatively, the improved method can comprise the additional steps of monitoring the speed of the motor vehicle and of influencing the step of varying the ratio of the transmission to thus change the ratio of the transmission when the motor vehicle is coasting with the result that the speed of the motor vehicle is reduced at least until the transmission ratio is changed to a predetermined value.

Still further, the improved method can comprise the additional steps of monitoring the speed of the motor vehicle and of influencing the step of varying the transmission ratio to thus change the transmission ratio when the motor vehicle is coasting with the result that the speed of the motor vehicle remains at least substantially constant until the RPM of the prime mover reaches a predetermined threshold value.

The novel features which are considered as characteristic of the invention are set forth in particular in the appended claims. The improved motor vehicle itself, both as to its construction and the mode of operation of its power train, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
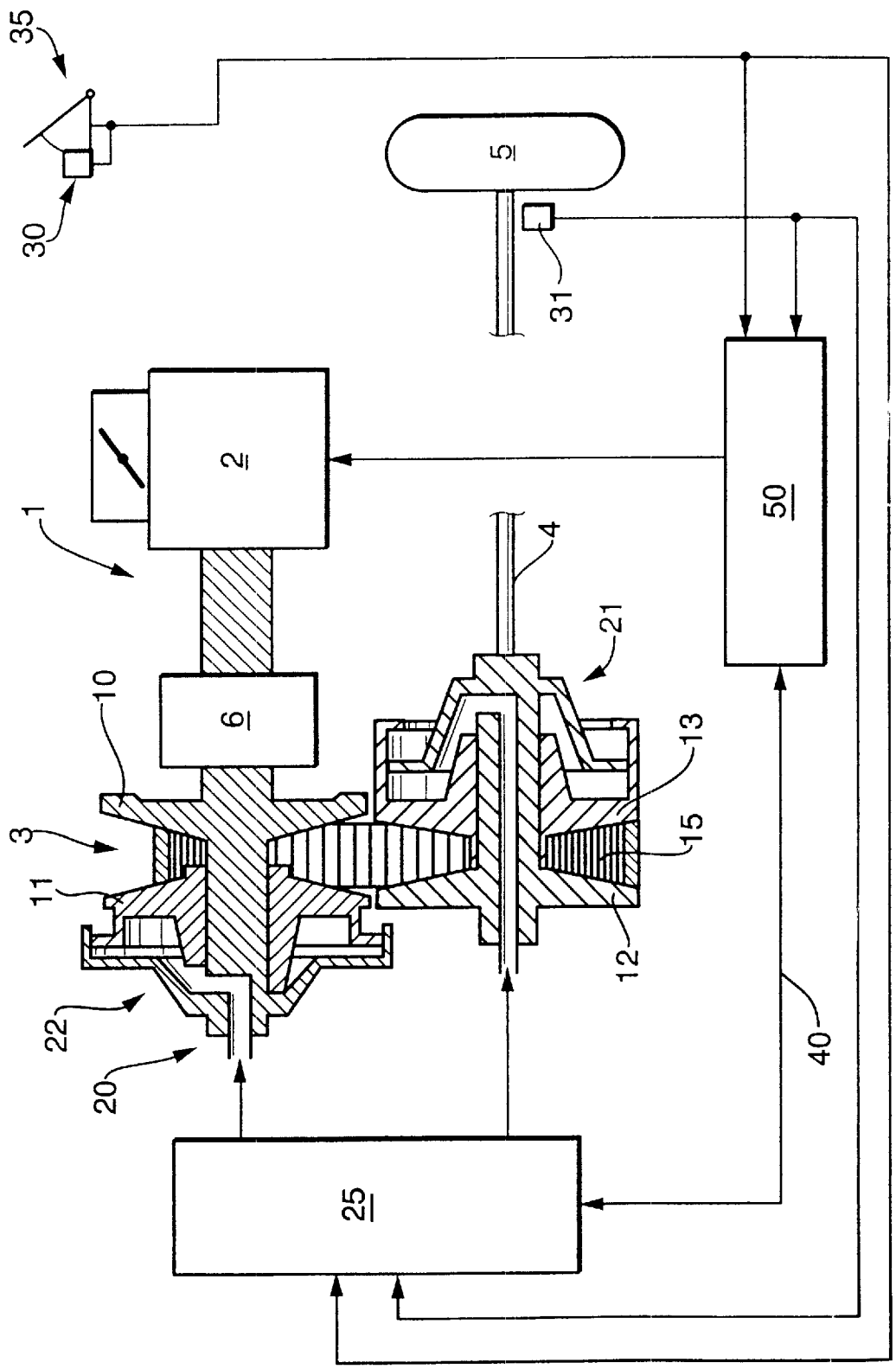
FIG. 1 is a fragmentary partly sectional and partly schematic plan view of a motor vehicle wherein the power train embodies one form of the present invention.
Figure 2:
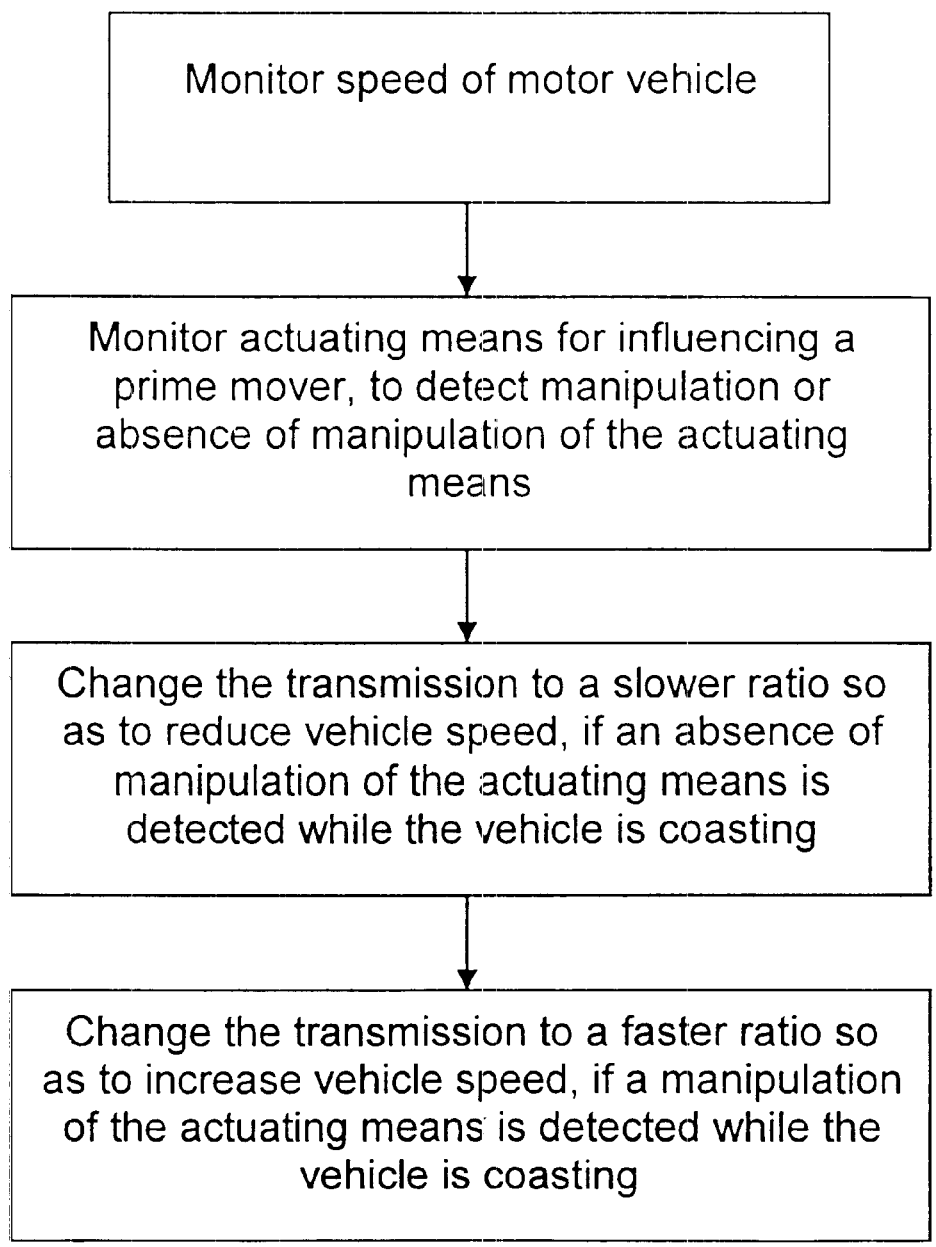
FIG. 2 shows the transmission controls of the present invention.

The drawing illustrates certain details of a motor vehicle 1 having a power train including a prime mover (such as an internal combustion engine), an infinitely variable ratio transmission 3 (the illustrated transmission is a CVT), a starting clutch 6 (e.g., a friction clutch) which can be engaged to transmit torque between the prime mover 2 and the transmission 3, and wheels 5 (only one shown) which can receive torque from a rotary output member 4 of the transmission during normal operation of the vehicle 1 and which can transmit torque to the member 4 of the transmission 3 when the vehicle is coasting. The means for transmitting torque between the prime mover 2 and the starting clutch 6 can comprise a shaft, such as a crankshaft or a camshaft. The power train further comprises a differential (not shown) which is installed between the output member 4 of the transmission 3 and the axles for the wheels 5.

The rotary input member of the transmission 3 carries or is of one piece with the axially fixed conical flange 10 of a first adjustable pulley or sheave of the transmission, and such pulley further comprises an axially adjustable conical flange 11 which is coaxial with the fixed flange 10. The output member 4 normally receives torque from a second pulley or sheave including an axially fixed conical flange 12 and an axially adjustable conical flange 13. The character 15 denotes an endless flexible element (e.g., a chain) which transmits torque between the pulleys including the flanges 10, 11 and 12, 13.

The starter (friction) clutch 6 can be replaced with a hydrokinetic torque converter without departing from the spirit of the present invention. A torque converter which can be utilized in lieu of the starter clutch 6 is disclosed, for example, in commonly owned U.S. Pat. No. 5,501,309 granted Mar. 26, 1996 to Ernst Walth et al. for "HYDROKINETIC TORQUE CONVERTER WITH LOCKUP CLUTCH". Another suitable torque converter is disclosed in commonly owned U.S. Pat. No. 5,782,327 granted Jul. 21, 1998 to Dieter Otto et al. for "HYDROKINETIC TORQUE CONVERTER AND LOCKUP CLUTCH THEREFOR".

The transmission 3 further comprises a customary direction of rotation reversing device (not shown) which is set in operation when the transmission is to be shifted into reverse gear. An infinitely variable ratio transmission which can be utilized in the power train of the motor vehicle 1 is disclosed, for example, in commonly owned U.S. Pat. No. 5,217,412 granted Jun. 8, 1993 to Norbert Indlekofer et al. for "CONTINUOUSLY VARIABLE SPEED TRANSMISSION". This patent also describes and shows means for reversing the direction of rotation of the output member of the transmission when the motor vehicle is to be driven in reverse. A friction clutch which can be utilized between the prime mover and the transmission of a power train is disclosed, for example, in commonly owned U.S. Pat. No. 5,759,106 granted on Jun. 2, 1998 to Wolfgang Reik et al. for "ASSEMBLY FOR COMPENSATION OF FLUCTUATIONS OF TORQUE".

Referring again to the drawing, the transmission 3 further comprises means 20 for infinitely varying its ratio. Such varying means includes a first actuator 21 and a second actuator 22. Each of these actuators can include or constitute a hydraulically operated cylinder and piston unit. One of the actuators 21, 22 is utilized to control friction between the flanges 10, 11 and 12, 13 on the one hand and the adjacent surfaces of the chain 15 on the other hand. The other actuator serves to vary and select the ratio of the transmission 3 by changing the axial distance between one of the pairs 10, 11 and 12, 13 of conical flanges whereby the chain 15 alters the axial distance between the flanges of the other pair. The drawing shows that the arcuate portion of the chain 15 which is trained over the pulley including the flanges 10, 11 is rather closely adjacent the common axis of these flanges. At the same time, that arcuate portion of the chain 15 which is trained over the pulley including the flanges 12, 13 is located at a greater radial distance from the common axis of these flanges. Accordingly, the chain 15 is set to drive the pulley including the flanges 12, 13 at a speed which is less than the speed of the pulley including the flanges 10, 11. The manner in which the flanges 11, 13 of the two pulleys forming part of the transmission 3 are adjustable relative to the respective axially fixed flanges 10, 12 is described in the aforementioned '412 patent to Indlekofer et al. as well as in commonly owned U.S. Pat. No. 5,711,730 granted Jan. 27, 1998 to Oswald Friedmann et al. for "TORQUE MONITORING APPARATUS".

The means 20 for infinitely varying the ratio of the transmission 3 further comprises a central control arrangement 25 which is operatively connected with and can transmit signals to the actuators 21, 22. Such control arrangement can comprise a computer and at least one memory. The computer receives signals from several sensors (the drawing shows a monitoring means including two sensors 30, 31) and from an operator-manipulatable prime mover actuating means including a central control arrangement 50 for the prime mover 2, and processes such signals for transmission to the actuator 21 and/or 22 in order to effect an appropriate automatic adjustment of the ratio of the transmission 3.

The sensor 30 constitutes a means for monitoring the position of an operator-manipulated gas pedal 35, and its signals inform the control arrangements 25, 50 whether or not the prime mover 2 is idling. The other sensor 31 monitors the RPM of the axis of the illustrated wheel 5 and hence the speed of the motor vehicle 1. Additional sensors (not shown) can be provided to monitor a host of additional parameters of the motor vehicle 1. For example, such additional parameters can include the RPM of the prime mover 2, the RPM of the input member of the transmission 3, the RPM of the output member 4, the position of the customary pivotable flap forming part of a throttle valve for the prime mover 2, the torque of the prime mover 2, the momentary ratio of the transmission 3, the position(s) of the brake actuating means, and/or others. Reference may be had, for example, to the disclosure in commonly owned U.S. Pat. No. 5,725,456 granted Mar. 10, 1998 to Robert Fischer et al. for "METHOD OF REGULATING THE OPERATION OF A TORQUE TRANSMISSION APPARATUS". FIG. 1 of this patent shows monitoring means including numerous sensors arranged to transmit signals to at least one control arrangement (13).

The arrangement 50 controls the operation of the prime mover 2. For example, if the gas pedal 35 is depressed, the control arrangement 50 can change the position of the aforementioned throttle valve or the rate of fuel injection into the cylinders of a combustion engine denoted by the reference character 2 to thus determine or select the RPM and/or the torque of the engine. The reference character 40 denotes a signal transmitting connection between the control arrangements 25 and 50; such connection can transmit sensor signals and/or processed signals from the control arrangement 25 to the control arrangement 50 and/or vice versa.

When the gas pedal 35 is not depressed, the control arrangement 50 is set up to control the operation of the prime mover 2 while the motor vehicle 1 is coasting. Thus, absence of depression of the gas pedal 35 by the operator of the motor vehicle 1 while the prime mover 2 is on is evaluated at 50 as an indication that the prime mover 2 must be set up for operation which, in accordance with the present invention, is best suited while the prime mover is idling and the vehicle 1 is coasting.

The speed of the motor vehicle 1 (while the gas pedal 35 is not depressed) is ascertained by the control arrangement 25 (such as in response to a signal from the sensor 31). If the speed of the vehicle 1 is on the increase during coasting, the control arrangement 25 causes a change of the ratio of the transmission 3 so that the speed of the vehicle remains at least substantially constant.

It goes without saying that the sensor 31 can be omitted and/or utilized with one or more additional sensors (such as one or more sensors shown in FIG. 1 of the '456 patent to Fischer et al.), as long as the control arrangement 25 can ascertain the speed of the prime mover 2 and can carry out the aforedescribed undertaking of changing the ratio of the transmission 3. For example, the speed of the motor vehicle 1 can be ascertained on the basis of signals denoting the RPM of a component part of the transmission 3 and/or signals denoting the RPM of the prime mover 2, e.g., by processing such signals jointly with those denoting the momentary ratio of the transmission 3 and/or of the power train of the vehicle 1.

The mode of operation of the control arrangement 25 (while the vehicle 1 is coasting) is preferably such that the ratio of the transmission 3 is varied, at least for a certain interval of time, until the RPM of the prime mover 2 reaches a threshold value and/or until the ratio of the transmission 3 reaches a preselected value. Once at least one of these prerequisites is reached or met, the speed of the vehicle can be increased again as soon as the aforementioned interval of time has elapsed.

It will be seen that the braking torque of the prime mover 2 is put to use practically as soon as the motor vehicle 1 is coasting, e.g., during travel along a downwardly sloping road surface. As already explained above, the braking torque is utilized to maintain the speed of the coasting motor vehicle at a constant value or to even reduce such speed. The means for indicating the actual velocity of the vehicle 1 can rely on a means for monitoring the drag torque of the prime mover, the RPM of the input (see 10) and/or output (see 4) member of the transmission 3, the position of the gas pedal 35 and/or others. If the position or condition of the sensor 30 indicates that the prime mover 2 is idling (i.e., that the gas pedal 35 is not depressed), the ratio of the transmission 3 is selected in such a way that it is reduced to an extent which is required to ensure that the speed of the coasting motor vehicle 1 does not increase or that such speed is actually reduced (e.g., only slightly). Such selection of the transmission ratio persists until the drag torque of the prime mover 2 reaches a maximum drag torque (in dependency upon the RPM of the prime mover). The selection of a transmission ratio which actually entails a reduction of the speed of the coasting vehicle is terminated when the engine drag torque reaches the maximum value.

If the operator of the motor vehicle desires to accelerate the vehicle during travel along a downwardly sloping road surface, the pedal 35 is simply depressed (preferably only slightly). The sensor 30 then no longer transmits or emits a signal denoting that the prime mover 2 is idling. This does not necessarily entail an immediate injection of fuel into the cylinders of a combustion engine (prime mover); the reason is the customary play of the gas pedal 35 and, therefore, it is still possible to shift the transmission 3 into a different ratio, preferably a ratio (overdrive) which causes the vehicle to advance at an elevated speed. Consequently, the drag torque of the prime mover 2 can cause a less pronounced braking of the wheels 5 due to longer transmission between the prime mover and the wheels.

The disclosures of the German priority applications (Serial No. 199 17 280.3 filed Apr. 16, 1999 and Serial No. 199 19 342.8-14 filed Apr. 28, 1999) as well as of all U.S. and foreign patents and patent applications identified in the specification of the present application are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of motor vehicles and, therefore, such adaptations should and are intended to be comprehended with in the meaning and range of equivalence of the appended claims.

What is claimed is:

1. A motor vehicle comprising:

a prime mover;

an infinitely variable ratio transmission including a rotary input member and a rotary output member;

at least one wheel arranged to receive torque from said output member when said prime mover drives said input member and to transmit torque to said prime mover by way of said members when the vehicle is coasting;

operator-manipulatable actuating means for influencing said prime mover, said actuating means having a non-actuated state where no operator manipulation is present and an actuated state where operator manipulation is present, wherein the actuated state comprises a slightly actuated state where due to a play in the actuating means the prime mover is not yet being influenced;

means for infinitely varying the ratio of said transmission, including means for at least temporarily regulating said ratio to prevent an increase of vehicle speed when the vehicle is coasting; and a sensor arranged to detect said non-actuated state and said actuated state and to influence said varying means in order to regulate the ratio of said transmission while the vehicle is coasting so that as a result of the transmission-ratio regulation:

said speed increase of the coasting vehicle is prevented at least until the ratio of the transmission is changed to a predetermined value, if the sensor detects the non-actuated state, and the speed of the coasting vehicle is allowed to increase if the sensor detects the actuated state while the actuating means is still within the slightly actuated state.

2. A method of operating a variable-speed motor vehicle wherein a prime mover drives an infinitely variable ratio transmission when the vehicle is not coasting, wherein the transmission drives the prime mover while the vehicle is coasting, and wherein an operator-manipulated actuating means is arranged to influence the prime mover, said actuating means having a non-actuated state where no operator manipulation is present and an actuated state where operator manipulation is present, wherein the actuated state comprises a slightly actuated state where due to a play in the actuating means the prime mover is not yet being influenced, said actuating means comprising a sensor to detect said non-actuated state and said actuated state, and wherein the motor vehicle embodies means for infinitely varying the ratio of the transmission to at least temporarily regulate the transmission ratio so as to prevent an increase of vehicle speed when the vehicle is coasting, the method comprising the steps of:

monitoring the sensor, and dependent on whether the non-actuated state or the actuated state is detected, regulating the ratio of the transmission when the vehicle is coasting so that as a result of the transmission-ratio regulation:

if the non-actuated state is detected, said speed increase of the coasting vehicle is prevented at least until the ratio of the transmission is changed to a predetermined value, and if the actuated state is detected while the actuating means is still within the slightly actuated state, the vehicle speed is allowed to increase.

* * * * *